E. M. ERB.
TEST INDICATOR.
APPLICATION FILED FEB. 11, 1908. RENEWED MAR. 22, 1911.
1,006,924.
Patented Oct. 24, 1911.
2 SHEETS—SHEET 1.
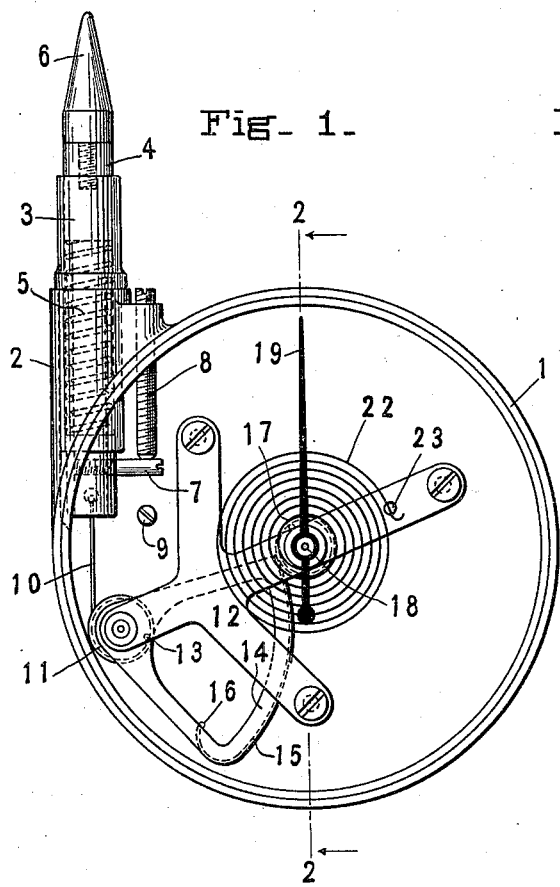
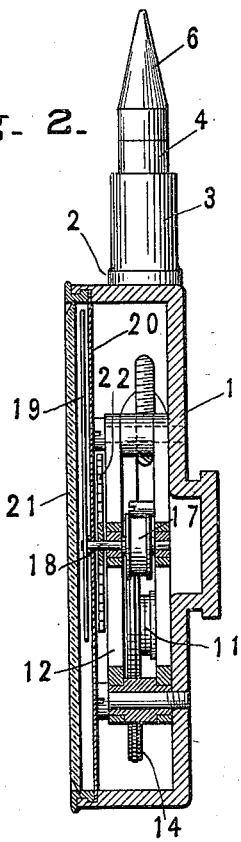
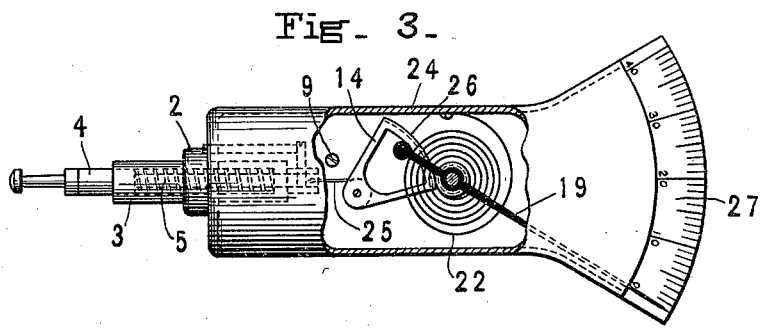
WITNESSES:
INVENTOR
E. M. Erb
BY
Charles H. Orton
ATTORNEY.
COLUMBIA PLANOGRAPH CO., WASHINGTON, D. C.

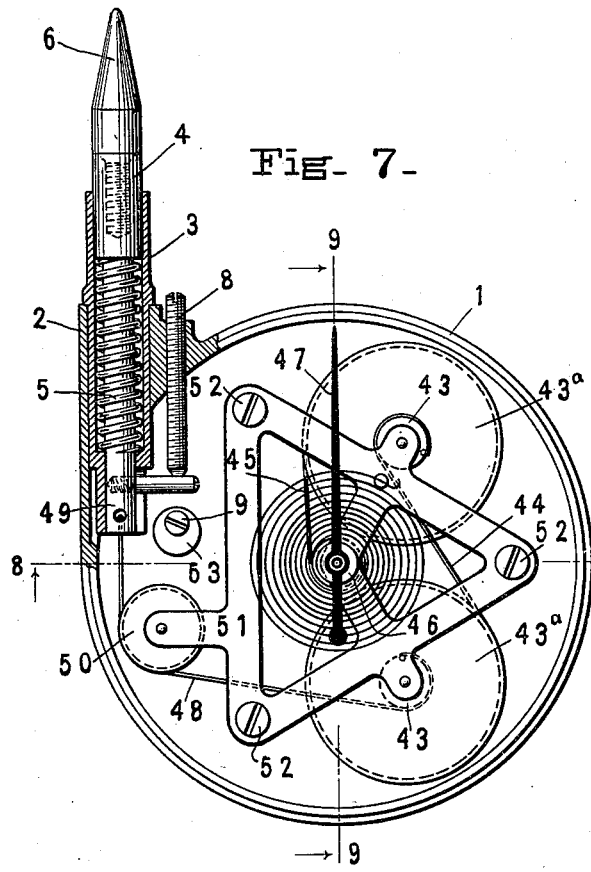
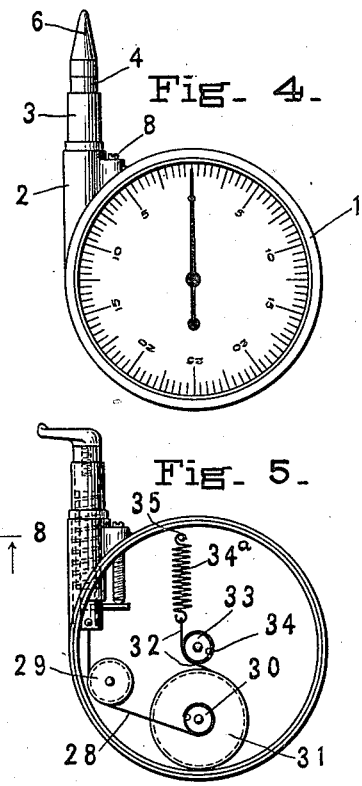
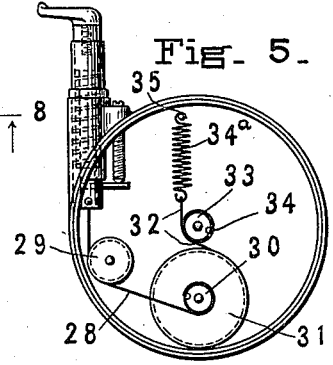
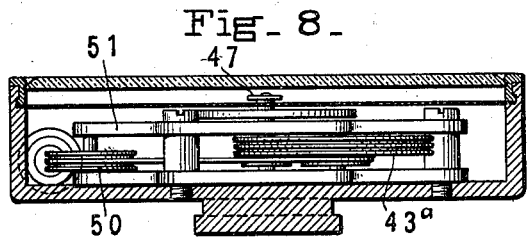
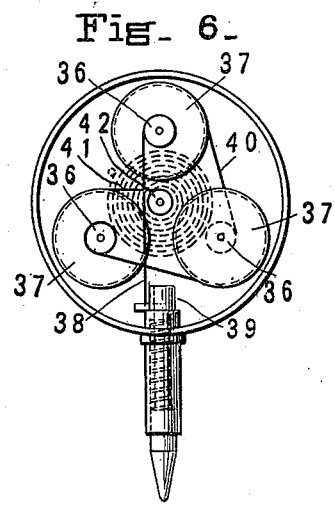
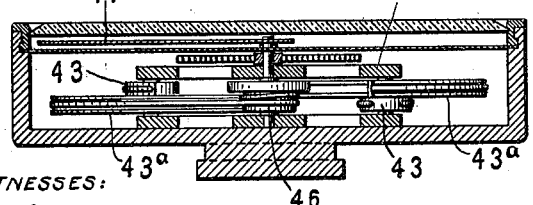

UNITED STATES PATENT OFFICE.

EDMUND M. ERB, OF JERSEY CITY, NEW JERSEY.

TEST-INDICATOR.

1,006,924.

Specification of Letters Patent. Patented Oct. 24, 1911.

Application filed February 11, 1908, Serial No. 415,279. Renewed March 22, 1911. Serial No. 616,236.

*To all whom it may concern:*

Be it known that I, EDMUND M. ERB, residing at Jersey City, in the county of Hudson and State of New Jersey, have invented certain new and useful Improvements in Test-Indicators, of which the following is a specification.

This invention relates broadly to indicating mechanism but more particularly to test indicators adapted to be used for ascertaining whether the work in a lathe or analogous machine is running true.

One of the objects of the present invention is to provide a device of the above character of simple construction which will be accurate and sensitive in operation.

A further object is to provide a test indicator of the above type characterized by a minimum number of parts, and one in which all danger of lost motion between the contact member and the indicator is eliminated, thereby insuring that the indicator will indicate with accuracy the slightest inaccuracy of the work.

Other objects will be in part obvious and in part pointed out hereinafter.

The invention accordingly consists in the features of construction, combination of elements, and arrangement of parts which will be hereinafter described and the scope of the application of which will be indicated in the appended claims.

In the accompanying drawings wherein is illustrated several of various possible embodiments of my invention, Figure 1 is a plan view of one of the embodiments of my invention with the cover portion and dial removed in order to expose the operative parts, Fig. 2 is a vertical sectional view taken on line 2—2, Fig. 1, Fig. 3 is a view in elevation of a different embodiment of my invention, a portion of the casing of which is broken away to expose the operative parts, Fig. 4 is a view in elevation showing a completed device of the character illustrated in the embodiments embraced in Figs. 1, 2, 5 and 7 to 9 inclusive, Fig. 5 is a view in elevation of another embodiment of the invention, Fig. 6 is a similar view of another embodiment thereof, Fig. 7 is a similar view of still another embodiment thereof, Fig. 8 is a cross sectional view taken on line 8—8, Fig. 7, and Fig. 9 is a similar view taken on line 9—9, Fig. 7.

Before proceeding upon a description of the operative mechanisms which constitute the several embodiments of my invention illustrated herein, it may be conducive to clearness first to state that in all test indicators of this type the movement of a spindle or contact member must be magnified or multiplied a convenient number of times, so that a very minute movement of the contact member will give the reading or indicating hand a much greater and easily discernible travel over the scale or dial with which it coöperates. Furthermore, this relative movement of the contact member and the hand or indicator must be maintained in a constant ratio within the limits of the capacity of the instrument.

Most dial indicators as hitherto constructed utilize a train of gears, which is primarily actuated by a rack on the contact member which meshes with the pinion on the first gear wheel multiplying set, said train of gear wheels being so arranged as to multiply or magnify the movement of the contact member. Such constructions have been found objectionable by reason of the fact that the teeth of the gear wheels employed must necessarily be of very fine pitch to afford an even and steady movement of the indicating hand, and in order to minimize wear, it has been necessary to harden the gear wheels, thus making the instrument costly and easily liable to injury unless it is handled with great delicacy. In such constructions every tooth contact constitutes a friction surface and must be maintained absolutely clean and lubricated in order to operate smoothly and indicate with accuracy minute and slow movements of the contact member.

In order to eliminate the above, among other disadvantages, I have provided an instrument having movement multiplying means such that many of the defects inherent in gear-train constructions are overcome and a cheap and reliable instrument provided, capable of standing all ordinary use and considerable abuse. It will be apparent that these ends are attained in the embodiments of my invention hereinafter described.

Referring now to the drawings, and particularly to Figs. 1 and 2, which represent a preferred embodiment of the invention, 1 represents the casing of the instrument which is provided with a hollow lug or projection 2, within which is firmly secured a sleeve 3. This sleeve is adapted to receive a freely slidable spindle 4 and an extensile, helical spring 5 which takes against a shoulder on the spindle and normally urges the same to outward movement. The outer end of the spindle 4 is formed to receive a point or contact piece 6 of any desired shape or contour. A stud 7 secured to spindle 4 slides in a longitudinal slot in sleeve 3 Fig. 7 and prevents any rotary motion of the spindle and limits its endwise movement under the stress of spring 5 by contact with the end of an adjusting screw 8 and with a screw 9 secured to the bottom wall of the casing and projecting inwardly therein. It will be observed that stud 7 works in the space provided between adjusting screw 8 and stop screw 9 and that the engagement of those parts by stud 7 limits or determines the range of movement of the contact piece. To the inner end of spindle 4 is attached a flexible member 10 which passes about the periphery of a wheel 11 suitably journaled in a frame 12 provided within the casing, and having its end secured to said wheel at a point near its periphery as at 13. Flexible member 10 may be constituted by a cord, strap, ribbon, wire or chain although a narrow steel band is preferably employed in this relation. It will be understood however that any flexible and non-extensible substance may be employed. Secured to wheel 11 and adapted to rotate therewith, in the present instance, is a sector wheel 14 about the periphery of which extends a flexible member 15 which, in the present instance, is constituted by a steel band similar to that shown at 10. This steel band has one of its ends secured at 16 to the sector wheel and has its opposite end secured to a wheel 17 attached to the axle stem 18 of the indicating hand. The indicating member in the present instance comprises a rotatably mounted needle or hand 19 adapted to coöperate with a suitable scale or dial 20 disposed beneath the transparent cover portion 21 of the casing. A spiral spring 22 has its outer end secured at 23 in frame 12 and its inner end attached to the axle wheel of the indicating hand and normally urges the same to rotation, said spring always exerting a pull through connecting band 15, sector wheel 14 connecting band 10 and spindle 4 against spring 5. The relative strengths of these springs are such that spring 5 at any point within the range of movement of spindle 4 overcomes the pull of spring 22 and thus always returns the spindle to its normal position of rest with stud 7 resting against adjusting screw 8. When any movement is given spindle 4 due to the engagement of the contact point 6 with the work a corresponding multiplied movement is given the hand or indicator 19 by the spring 22 according to the ratio existing between the diameters of sector wheel 14 and indicator wheel 17. As springs 5 and 22 always oppose each other there can be no lost motion in the system and the slightest movement of contact member 6 will be indicated by the indicating hand 19 upon the scale of dial.

The embodiment of my invention illustrated in Fig. 3 differs from that above described in that an oblong or substantially rectangular casing 24 is provided, the spindle and the multiplying sector wheel being connected by a flexible band 25 and the sector wheel being connected with the indicator wheel by a similar flexible band 26 in a manner similar to that in the embodiment above described. In this embodiment of my invention the indicating hand or pointer works upon a sector shaped scale 27 formed at the end of the casing.

Referring now to the embodiment of my invention illustrated in Fig. 5 a flexible member or band 28 is connected with the spindle and passes over the periphery of a sheave wheel 29 and is secured to a suitably journaled multiplying device constituted by a small wheel 30 to the periphery of which band 28 is secured, said wheel 30 being secured concentrically to a larger wheel 31 to which is secured and about the periphery of which extends a band 32. The intermediate portion of band 32 passes around a wheel 33 attached to the stem of the indicator hand and is attached thereto as at 34. The free end of band 32 is attached to the end of a retractile spring 34$^a$ the opposite end of which spring is attached to a fixed post or support as at 35. It will be understood that in this embodiment, a tensional relation is at all times maintained between the spindle of the contact member and the indicator hand as in the embodiment first above described, and that upon a given movement of the contact member a magnified or multiplied movement will be afforded the indicator hand with respect to its scale.

In the embodiment illustrated in Fig. 6 the movement of the indicator hand over the dial afforded by a movement of the contact member is multiplied a greater number of times than in the embodiment illustrated in Fig. 5 through the provision of a plurality of coacting movement multiplying devices. Each of these multiplying devices is constituted by a pair of wheels 36 and 37 connected together and adapted to rotate upon a common axis. A flexible band 38 extends from spindle 39 to the periphery of the smaller wheel 36 and a similar band 40 extends from the periphery of the larger wheel 37 to the periphery of the smaller wheel 36 of the multiplying device arranged in advance thereof. This multiplying device is similarly connected to a third multiplying device which is in turn similarly connected by a band 41 to a wheel 42 secured to the stem of the indicator hand.

In the embodiment of my invention shown in Figs. 7 to 9 inclusive two sets of movement multiplying devices are provided each of which is constituted by wheels 43 and 43ª respectively, the periphery of wheel 43ª being connected by a flexible band 44 with the periphery of wheel 43 of the set disposed in advance thereof and the periphery of wheel 43ª of said advance set is connected by a flexible band 45 with the periphery of a wheel 46 attached to the stem of the indicator hand or pointer 47. A flexible band 48 connects the inner end of spindle 49 with the periphery of the smaller wheel 43 of the first of the multiplying sets, said flexible band at its intermediate portion passing over a sheave wheel 50. The multiplying devices, the stem of the indicator hand and the sheave wheel in this embodiment of my invention are journaled in a frame 51 secured within the casing by means of screws 52. In this embodiment of my invention an adjustable eccentrically mounted member 53 constitutes a stop for limiting the inward movement of spindle 49. As it will be understood the operation of this embodiment of my invention is substantially similar to those above described, the several elements constituting the same being maintained in tensional relation by opposing springs connected to the system at opposite ends thereof.

It will accordingly be seen that I have provided constructions especially adapted to attain, among others all the ends and objects above enumerated in an exceedingly efficient maner. By reason of the fact that a constant tensional relation is maintained between the contact member and the indicating hand or pointer all danger of inaccuracies of measurement occurring through lost motion is eliminated. It is also apparent that the efficiency of the instrument and its accuracy in making measurements will not be impaired through long continued use by reason of the fact that gear wheels and similar objectionable contrivances heretofore employed for multiplying the movement of the contact member are entirely eliminated.

While the instrument is more especially adapted to the needs of the tool-maker and inspector, for constructing accurate jigs and dies, and for testing the truth of alinements and movements of spindles, etc., it is also particularly well adapted for use in setting the work in various machine tools. As will be understood, instruments constructed in accordance with my invention are adapted to various other uses and may be held in the hand of the operator or mounted upon the machine in position to be carried into engagement with the work.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense. It is also to be understood that the language used in the following claims is intended to cover all of the generic and specific features of the invention herein described, and all statements of the scope of the invention which, as a matter of language, might be said to fall therebetween.

Having thus described my invention, what I claim as new and desire to secure by Letters Patent is:

1. In a device of the class described, in combination, a casing, a reciprocating contact member mounted in said casing and extending outwardly therefrom, a scale carried by the casing, an indicator rotatably mounted upon the casing and coöperating with said scale, a movement multiplying device rotatably mounted within said casing, a flexible member having one end connected with said movement multiplying device near the periphery thereof, and having its other end connected with said indicator, a flexible member connected with said movement multiplying device near the axis thereof, and having its other end connected with said contact member, a spring connected with said indicator and urging the same to rotation, and a spring engaging said contact member urging the same to outward movement.

2. In a device of the class described, in combination, a casing, a reciprocating contact member mounted in said casing and extending outwardly therefrom, a scale carried by the casing, an indicator mounted rotatably upon the casing and coöperating with said scale, a sector member pivotally mounted within the casing, a flexible member having one end attached to the periphery of said sector member and its other end attached to said indicator, a flexible member having one end attached to said sector member at a point adjacent the pivot thereof and its other end attached to said contact member, a coil spring having one end connected with said indicator and the opposite end attached to said casing, said spring urging said indicator to rotation, and a spring engaging said contact member and urging the same to outward movement, whereby said contact member and said indicator member are constantly maintained in tensional relation.

In testimony whereof I affix my signature, in the presence of two witnesses.

EDMUND M. ERB.

Witnesses:
R. H. MORGAN, Jr.,
C. H. WILSON.